US008840946B2

(12) United States Patent
Fleury Rey

(10) Patent No.: US 8,840,946 B2
(45) Date of Patent: Sep. 23, 2014

(54) BAKED COMPOSITION

(75) Inventor: Yvette Fleury Rey, Ursy (CH)

(73) Assignee: Nestec S.A., Vevey (CH)

( * ) Notice: Subject to any disclaimer, the term of this patent is extended or adjusted under 35 U.S.C. 154(b) by 203 days.

(21) Appl. No.: 12/602,969

(22) PCT Filed: Jun. 2, 2008

(86) PCT No.: PCT/EP2008/056788
§ 371 (c)(1),
(2), (4) Date: Dec. 3, 2009

(87) PCT Pub. No.: WO2008/148737
PCT Pub. Date: Dec. 11, 2008

(65) Prior Publication Data
US 2010/0233330 A1 Sep. 16, 2010

(30) Foreign Application Priority Data
Jun. 4, 2007 (EP) .................................... 07109495

(51) Int. Cl.
*A23L 1/22* (2006.01)
*A21D 13/00* (2006.01)
*A23L 1/227* (2006.01)
*A23L 1/226* (2006.01)
*A21D 10/04* (2006.01)
*A21D 10/00* (2006.01)
*A21D 2/24* (2006.01)
*A21D 2/18* (2006.01)

(52) U.S. Cl.
CPC ............. *A21D 13/008* (2013.01); *A23L 1/2275* (2013.01); *A23L 1/22628* (2013.01); *A23L 1/22671* (2013.01); *A21D 10/04* (2013.01); *A23L 1/22678* (2013.01); *A21D 10/00* (2013.01); *A21D 2/245* (2013.01); *A21D 2/181* (2013.01)
USPC ............ 426/534; 426/523; 426/535; 426/549

(58) Field of Classification Search
USPC ......... 426/520, 523, 534, 535, 536, 537, 538, 426/549, 650
See application file for complete search history.

(56) References Cited

FOREIGN PATENT DOCUMENTS

| EP | 1266581 | * 12/2002 |
| GB | 1401096 | * 7/1975 |
| GB | 1421397 | * 1/1976 |

OTHER PUBLICATIONS

Ian M. Whitehead, "Challenges to Biocatalysis from Flavor Chemistry," Foodtechnology, vol. 52, No. 2, Feb. 1998, pp. 40-46.
Shaw et al., "Response Surface Methodology in Flavor Research—Reaction of Rhamnose and Proline," Perfumer & Flavorist, vol. 15, Mar./Apr. 1990, pp. 60-66.
Haleva-Toledo et al., "4-Hydroxy-2,5-dimethyl-3(2H)-furanone Formation in Buffers and Model Solutions of Citrus Juice," J. Agric. Food Chem., vol. 45, (1997), pp. 1314-1319.
Haleva-Toledo et al., "Effects of L-Cysteine and N.-Acetyl-L-cysteine on 4-Hydroxy-2,5-dimethyl-3(2H)-furanone (Furaneol), 5-(Hydroxymethyl) furfural, and 5-Methylfurfural Formation and Browning in Buffer Solutions Containing either Rhamnose or Glucose and Arginine," J. Agric. Food Chem. (1999), vol. 47, pp. 4140-4145.
Schieberle, "The role of free amino acids present in yeast as precursors of the odorants 2-acetyl-1-pyrroline and 2-acetyltetrahydropyridine in wheat bread crust," Z Lebensm Unters Forsch, vol. 191, (1990), pp. 206-209.
Wong et al., "Chemical and Enzymatic Syntheses of 6-Deoxyhexoses. Conversion to 2,5-Dimethyl-4-hydroxy-2,3-dihydrofuran-3-one IFuraneol) and Analogues," J. Orig. Chem, vol. 48, (1983) pp. 3493-3497.
J. Ames, "The Maillard Reaction," B.J.F. Hudson—Biochemistry of Food Proteins, 1992, pp. 99-142.
P. Shaw, et al., "Base-Catalyzed Fructose Degradation and Its Relation to Nonenzymic Browning," J. Agr. Food Chem, vol. 16, 1968, pp. 979-982.
R. Tressl, et al., "Formation of 2,3-Dihydro-1H-pyrrolizines as Prolines Specific Maillard Products," J. Agr. Food Chem., vol. 33, 1985, pp. 919-923.
R. Tressl. et al., "Formation of Pyrrolidines and Piperdines on Heating L-Proline with Reducing Sugars," J. Agr. Food Chem., vol. 33, 1985, pp. 924-928.
J.E. Hodge, et al., "Compounds of Browned Flavor Derived from Sugar-Amine Reactions," Cereal Science Today, vol. 17, No. 2, Feb. 1972, pp. 34-38.
Ahmed, "Cool Developments," The World of Food Ingredients, Oct./Nov. 2006, pp. 46-48.
Wong et al., Chemical and Enzymatic Syntheses of 6-Deoxyhexoses. Conversion to 2,5-Dimethyl-4-hydroxy-2,3-dihydrofuran-3-one (Furaneol) and Analogues, J. Org. Chem. vol. 48 (1983), pp. 3493-3497.
Haleva-Toledo et al., 4-Hydroxy-2.5-dimethyl-3(2H)-furanone Formation in Buffers and Model Solutions of Citrus Juice, J. Agric. Food Chem., (1997) vol. 45, pp. 1314-1319.
Ian H. Whitehead, "Challenges to Biocatalysis from Flavor Chemistry," Foodtechnology, vol. 52, No. 2, Feb. 1998, pp. 40-46.
M.E. Bailey, "Maillard reactions and meat flavour development," Flavor of meat and meat products; F. Shahidi, Ed.; Chapman and Hall: Glasgow, 1994; pp. 153-173.

* cited by examiner

*Primary Examiner* — Leslie Wong
(74) *Attorney, Agent, or Firm* — K&L Gates LLP

(57) ABSTRACT

The present invention relates to a baked foodstuff with an improved flavor and an improved texture. Also to compositions for generating these improved flavors and textures in baked foodstuffs which compositions comprise non pre-reacted flavor precursors which react on heating to generate the flavors.

55 Claims, 3 Drawing Sheets

Table 1. Peak values as measured by GC-MS.

|  | Claimed invention (addition of precursors orn/gln/rha) | EP12665581 (Bioconversion of orn/gln/rha by yeast) |
| --- | --- | --- |
| furaneol | 53410702 | 37836153 |
| 5-methylfurfural | 274671 | 282336 |
| diacetyl | 699135 | 396393 |
| ethylpyrazine | 2314122 | 720631 |
| 2-ethyl-6-methylpyrazine | 1359964 | 443807 |
| 2-ethyl-5-methylpyrazine | 1771359 | 505468 |
| 2,3-diethyl-pyrazine | 143541 | 21923 |
| 2,5-diethyl-pyrazine | 278246 | 22958 |

BAKED COMPOSITION

This application is a 371 of PCT/EP08/56788 filed Jun. 2, 2008.

FIELD OF THE INVENTION

The present invention relates to a baked foodstuff with an improved flavor and an improved texture. Also to compositions for generating these improved flavors and textures in baked foodstuffs which compositions comprise non pre-reacted flavor precursors which react on heating to generate the flavors. In particular, the present invention relates to baked components of confectionery with improved biscuit, buttery, fruity, nutty, caramel, golden syrup, honey, toasted, roasted bread-like and baked flavors.

BACKGROUND TO THE INVENTION

The term "Maillard reaction" and "Maillard reactants/products" are terms of art which define the complex series of chemical reactions between carbonyl and amino components derived from biological systems and the associated reactants and products, respectively. The term Maillard reaction is used herein in the established broad sense to refer to these reactions, and includes the closely associated reactions which are usually coupled with the Maillard reaction sensu stricto (such as Strecker degradation).

In foods, the Maillard reaction results in both the production of flavors and browning (see Bailey, M. E. (1994) Maillard reactions and meat flavor development, pages 153-173, In: Flavour of meat and meat products, Ed. F. Shahidi, Academic Press; Ames, J. M. (1992) The Maillard Reaction, pages 99-143, In: Biochemistry of Food Proteins, Ed. B. J. F. Hudson, Elsevier App. Sci. London).

With respect to flavor generation, the Maillard reaction can be broken down into four stages. The first stage involves the formation of glycosylamines. The second stage involves rearrangement of the glycosylamines to form Amadori and Heyns rearrangement products (often abbreviated in the literature to "ARPs" and "HRPs", respectively). The third stage involves dehydration and or fission of the Amadori and Heyns rearrangement products to furan derivatives, reductones and other carbonyl compounds (which may have significant organoleptic qualities). (These "third stage products" may also be produced without the formation of ARP's or HRP's. The fourth stage involves the conversion of these furan derivatives, reductones and other carbonyl compounds into coloured and aroma/flavor compounds. Thus, products and reactants present in both the third and fourth stage of the Maillard reaction contribute towards aroma and or flavor.

Thus, the terms "Maillard reaction", "Amadori rearrangement product", "Heyns rearrangement product", "aroma compound" and "flavor compound", unless indicated otherwise, are used herein in the above-described senses.

Maillard reactions occur naturally in food, but it is also known to use Maillard reaction products to improve the flavor of foodstuffs.

Caramel and biscuit flavor generation has been described in many model reaction systems. 4-hydroxy-2,5-dimethyl-3 (2H)-furanone (corresponding to Furaneol™ a registered trademark of Firmenich Inc.) is one compound associated with caramel flavor. 4-hydroxy-2,5-dimethyl-3(2H)-furanone can be produced in high levels from 6-deoxy-hexoses such as rhamnose (6deoxy-L-mannose), fucose (6-deoxy-L-galactose) and 6-deoxy-fructose by reaction with an amine (Wong et al. 1983, J Org Chem 48: 3493-3497; Whitehead 1998, Food Technology February 52: 40-46). Specifically, 4-hydroxy-2,5-dimethyl-3(2H)-furanone can be generated from a rhamnose and amine interaction by Amadori formation via the loss of an amine group, forming 2,3-enolization leading to a diketone, which leads to 4-hydroxy-2,5-dimethyl-3(2H)furanone after dehydration and cyclization (Pisarnitskii et al. 1992, Appl Biochem Microbiol 28: 97-100). At basic pH, 4-hydroxy-2,5-dimethyl-3(2H)-furanone can be generated from rhamnose alone, whereas under acidic conditions formation is only found in presence of an amino acid (e.g. arginine). The combination of rhamnose and arginine results in 4-hydroxy-2,5-dimethyl-3(2H)-furanone formation, which is 40-50 fold higher than any other sugar amine combination (Haleva-Toledo et al. 1997, J Agric Food Chem 45: 1314-1319; 1999, J Agric Food Chem 47: 4140-4145). Maximum 4-hydroxy-2,5-dimethyl-3(2H)-furanone generation is found at pH 8.0 with increasing temperature (90° C.) in aqueous buffers. Lower amount of 4-hydroxy-2, 5-dimethyl-3(2H)-furanone can also be generated during base catalyzed fructose degradation (Shaw et al. 1968, J Agric Food Chem 16:979-982).

Amino acids as flavor precursors have been extensively studied in combination with reducing sugars in water or ethanol model Maillard reaction systems. Among the compounds known to be generated from proline and rhamnose are 4-hydroxy-2,5-dimethyl-3(2H)-furanone and several 2,3-dihydr (1H)-pyrrolizines (Shaw and Ho 1989, Thermal generation of aromas, eds. Parliament T H, McGorrin R J, Ho C-T, American Chemical Society, Washington, D.C.; Shaw et al. 1990, Perfumer & Flavorist 15: 60-66; Tressl et al. 1985, J Agric Food Chem 33: 919-923 and J Agric Food Chem 33: 934-928). As 4-hydroxy-2,5-dimethyl-3(2H)-furanone is thermally unstable, its concentration is strongly reduced at temperatures higher than 150° C. in model aqueous reaction systems. The biscuit/bready/roast flavor attributes have also been studied in many model systems. Proline was described by Hodge et al. (1972, Cereal Sci Today 17: 3440) as the key amino acid precursor for roast aroma. It was further shown by Schieberle (1990, Z Lebensm Unters Forsch 191: 206-209) that a key impact compound, 2-acetyl-1-pyrroline was generated from proline and ornithine. In U.S. Pat. No. 3,687,692 and U.S. Pat. No. 3,782,973 it was reported that proline-based reaction mixtures produced a caramel character upon heating with cyclic ketones. U.S. Pat. No. 4,022,920 disclosed that Amadori rearrangement compounds have been produced from proline and 6-deoxy-aldohexoses such as rhamnose under reflux in ethanol followed by drying. The dried mixture was incorporated into a food matrix followed by heating.

U.S. Pat. No. 4,940,592 is directed to a process wherein rhamnose is mixed with amino acids such as leucine, alanine, and phenylalanine in water or propylene glycol, coated onto uncooked foodstuff followed by microwave radiation. U.S. Pat. No. 5,041,296 also disclosed flavor precursors treated by microwave radiation before mixing with a foodstuff. EP 0 398 417B1 also disclosed reactions between rhamnose and proline in other non-fat systems such as water, ethanol, propylene glycol and glycerol.

WO0249452 discloses a process for the production of flavor concentrates comprising the addition of a mixture of flavor precursors comprising proline, ornithine or protein hydrolysate, and rhamnose, fructose or fucose, to a fat-based medium and heating the mixture to about 100-140 C for about 10-120 minutes.

However, there are problems associated with the introduction into baked foodstuffs of flavor active molecules generated by Maillard reactions.

The time taken to generate appreciable quantities of flavor active materials, for example by reacting amino acids and reducing sugars, is long relative to the baking times of many baked products. For example, in U.S. Pat. No. 4,022,920 example 1,6-deoxy-D-galactose and L-proline are refluxed in ethanol for 3 hours to generate flavorants. The flavor active reaction products, extracted into fat, are added to a shortcake dough and baked in example 9 of U.S. Pat. No. 4,022,920 rather than the un-reacted amino acid and reducing sugar.

If mixtures of flavor active molecules are added to ingredients which are then baked (e.g. in the production of wafer or extruded cereals), many desirable volatile flavor components are lost. This has a number of disadvantages. The desirable aromas/flavors associated with volatile compounds are only found in low levels in the finished product (having been lost during the preparation process). Moreover, many components of the finished flavor may be flashed off during cooking (so leading to loss from the flavor profile of important aroma volatiles). This is a particular problem in wafer baking as large volumes of steam are vented during the baking process which will carry away volatile and water soluble flavor active molecules. This has two major disadvantages as it removes flavor from the final product and leads to an unpleasant working environment around the ovens.

WO9962357 discloses flavor releasing compositions using micro emulsions where a flavor precursor is converted into an active flavor in the mouth. The increase in water activity activates an enzyme to convert the flavor precursor into a flavor. However, such compositions are not readily applied to ingredients which are baked to form baked foodstuffs. During baking the micro emulsions will be dehydrated and break down, and any enzymes will be denatured by the heat.

In baked goods that comprise other components, such as a chocolate coated wafer biscuit, it is possible to add flavor active molecules generated by reacting flavor precursors into the non baked component. However, consumers expect the desirable baked flavors to come from the baked component, and tasting these flavors in a different component such as the chocolate coating is undesirable as it can seem artificial to the consumer.

SUMMARY OF THE INVENTION

It has been surprisingly found that the addition of flavor precursors (amino acids and reducing sugars) according to the invention directly to ingredients which are then baked to form baked foodstuffs overcomes these issues and allows an improved delivery of flavor by the formation of the aroma molecules even when the baking duration is short. Consequently, the flavor active molecules generated from the flavor precursors are exposed to high temperatures for a shorter time leading to a unique and desirable flavor profile and improved texture.

Without wishing to be bound by theory, the high temperature and pressure generated in such baking environments as between wafer plates or in the barrel of an extruder create aqueous conditions above 100° C. which accelerate the formation of flavor active molecules.

In addition, by adding the flavor precursors to the ingredients of the baked goods they can react with other components (such as amino acids and sugars in flour) to generate a wider range of flavor and, as the structure of the baked goods forms at the same time as the flavor active molecules are generated, the flavor active molecules become trapped within the food matrix. As less of the flavor active molecules are lost from the foodstuff during baking, the desirable notes are stronger in the finished baked foodstuff and the environment surrounding the baking process is pleasanter to work in.

Preferred embodiments of the invention are described in the claims.

Claim 1 deals with a baked foodstuff with an improved flavor characterised in that flavor active molecules in the baked foodstuff comprise 2,5-di-methyl-4-hydroxy-3[2H]-furanone, 5-methylfurfural, diacetyl, and 2-acetyl-1-pyrroline.

In one embodiment, the invention deals with the baked foodstuff of claim 1 wherein the measurement of peak areas by GC-MS gives a minimum level of 50000 for the peak corresponding to 2,5-di-methyl-4-hydroxy-3[2H]-furanone and/or a minimum level of 10000 for the peak corresponding to 5-methylfurfural and/or a minimum level of 55000 for the peak corresponding to diacetyl and/or a minimum level of 1000 for the peak corresponding to 2-acetyl-1-pyrroline.

In another embodiment, the invention deals with the baked foodstuff of claim 1 wherein the measurement of peak areas by GC-MS gives a minimum level of 50000 for the peak corresponding to 2,5-di-methyl-4-hydroxy-3[2H]-furanone a minimum level of 10000 for the peak corresponding to 5-methylfurfural a minimum level of 55000 for the peak corresponding to diacetyl and a minimum level of 1000 for the peak corresponding to 2-acetyl-1-pyrroline.

Another embodiment of the invention, claim 4, deals with a baked foodstuff with an improved flavor characterised in that the flavor active molecules in the baked foodstuff comprise
a) 2,5-di-methyl-4-hydroxy-3[2H]-furanone, 5-methylfurfural, diacetyl, and 2-acetyl-1-pyrroline wherein the measurement of peak areas by GC-MS gives a minimum level of 50000 for the peak corresponding to 2,5-di-methyl-4-hydroxy-3[2H]-furanone and/or a minimum level of 10000 for the peak corresponding to 5-methylfurfural and/or a minimum level of 55000 for the peak corresponding to diacetyl and/or a minimum level of 1000 for the peak corresponding to 2-acetyl-1-pyrroline and at least one of the following flavors:
b) 1,2 Diacetylethylene, with a peak at a minimum level of 109000,
Ethylpyrazine, with a peak at a minimum level of 149000,
2-ethyl-6-methyl pyrazine with a peak at a minimum level of 47000,
2-ethyl-5-methyl pyrazine with a peak at a minimum level of 72000,
2,3-diethyl-pyrazine with a peak at a minimum level of 11000,
2,5-diethyl-pyrazine with a peak at a minimum level of 17000,
2,6-diethyl-pyrazine with a peak at a minimum level of 37000,
5-ethyl-2,3-dimethyl pyrazine with a peak at a minimum level of 32000,
2-methyl-3,5-diethyl pyrazine with a peak at a minimum level of 16000.

In another embodiment, the invention deals with a baked foodstuff according to claim 4 wherein a measurement of peak areas by GC-MS gives a level of
b) 1,2 Diacetylethylene, with a peak at a minimum level of 327000,
Ethylpyrazine, with a peak at a minimum level of 933000,
2-ethyl-6-methyl pyrazine with a peak at a minimum level of 236000,
2-ethyl-5-methyl pyrazine with a peak at a minimum level of 598000,
2,3-diethyl-pyrazine with a peak at a minimum level of 49000, 2,5-diethyl-pyrazine with a peak at a minimum level of 148000,
2,6-diethyl-pyrazine with a peak at a minimum level of 241000,
5-ethyl-2,3-dimethyl pyrazine with a peak at a minimum level of 175000,
2-methyl-3,5-diethyl pyrazine with a peak at a minimum level of 164000.

In another embodiment, the invention deals with a baked foodstuff according to claim 4 wherein a measurement of peak areas by GC-MS gives a level of
b)
1,2 Diacetylethylene, with a peak at a minimum level of 54000,
Ethylpyrazine, with a peak at a minimum level of 148000,
2-ethyl-6-methyl pyrazine with a peak at a minimum level of 146000,
2-ethyl-5-methyl pyrazine with a peak at a minimum level of 141000,
2,3-diethyl-pyrazine with a peak at a minimum level of 4000,
2,5-diethyl-pyrazine with a peak at a minimum level of 4000,
2,6-diethyl-pyrazine with a peak at a minimum level of 14000,
5-ethyl-2,3-dimethyl pyrazine with a peak at a minimum level of 46000,
2-methyl-3,5-diethyl pyrazine with a peak at a minimum level of 16000.

In another embodiment, the invention deals with a baked foodstuff according to claim 4 wherein a measurement of peak areas by GC-MS gives a minimum level of
b)
1,2 Diacetylethylene, with a peak at a minimum level of 7000,
Ethylpyrazine, with a peak at a minimum level of 20000,
2-ethyl-6-methyl pyrazine with a peak at a minimum level of 24000,
2-ethyl-5-methyl pyrazine with a peak at a minimum level of 12000,
2,3-diethyl-pyrazine with a peak at a minimum level of 800,
2,5-diethyl-pyrazine with a peak at a minimum level of 200,
2,6-diethyl-pyrazine with a peak at a minimum level of 1600,
5-ethyl-2,3-dimethyl pyrazine with a peak at a minimum level of 5500,
2-methyl-3,5-diethyl pyrazine with a peak at a minimum level of 800.

In another embodiment, the invention deals with a baked foodstuff according to claim 4 wherein a measurement of peak areas by GC-MS gives a level of
b)
1,2 Diacetylethylene, with a peak at a minimum level of 110000,
Ethylpyrazine, with a peak at a minimum level of 415000,
2-ethyl-6-methyl pyrazine with a peak at a minimum level of 201000,
2-ethyl-5-methyl pyrazine with a peak at a minimum level of 514000,
2,3-diethyl-pyrazine with a peak at a minimum level of 78000,
2,5-diethyl-pyrazine with a peak at a minimum level of 148000,
2,6-diethyl-pyrazine with a peak at a minimum level of 127000,
5-ethyl-2,3-dimethyl pyrazine with a peak at a minimum level of 122000,
2-methyl-3,5-diethyl pyrazine with a peak at a minimum level of 145000.

In another embodiment, the invention deals with a baked foodstuff according to claim 4 wherein a measurement of peak areas by GC-MS gives a minimum level of
b)
1,2 Diacetylethylene, with a peak at a minimum level of 7000,
Ethylpyrazine, with a peak at a minimum level of 58000,
2-ethyl-6-methyl pyrazine with a peak at a minimum level of 106000,
2-ethyl-5-methyl pyrazine with a peak at a minimum level of 50000,
2,3-diethyl-pyrazine with a peak at a minimum level of 1000,
2,5-diethyl-pyrazine with a peak at a minimum level of 900,
2,6-diethyl-pyrazine with a peak at a minimum level of 4400,
5-ethyl-2,3-dimethyl pyrazine with a peak at a minimum level of 21000,
2-methyl-3,5-diethyl pyrazine with a peak at a minimum level of 4000.

In another embodiment, the invention deals with a baked foodstuff according to claim 4 wherein a measurement of peak areas by GC-MS gives a minimum level of
b)
1,2 Diacetylethylene, with a peak at a minimum level of 8000,
Ethylpyrazine, with a peak at a minimum level of 80000,
2-ethyl-6-methyl pyrazine with a peak at a minimum level of 117000,
2-ethyl-5-methyl pyrazine with a peak at a minimum level of 50000,
2,3-diethyl-pyrazine with a peak at a minimum level of 1000,
2,5-diethyl-pyrazine with a peak at a minimum level of 1000,
2,6-diethyl-pyrazine with a peak at a minimum level of 10000,
5-ethyl-2,3-dimethyl pyrazine with a peak at a minimum level of 12000,
2-methyl-3,5-diethyl pyrazine with a peak at a minimum level of 4000.

In another embodiment, the invention deals with a baked foodstuff according to claim 4 wherein a measurement of peak areas by GC-MS gives a minimum level of
b)
1,2 Diacetylethylene, with a peak at a minimum level of 275000,
Ethylpyrazine, with a peak at a minimum level of 1428000,
2-ethyl-6-methyl pyrazine with a peak at a minimum level of 1818000,
2-ethyl-5-methyl pyrazine with a peak at a minimum level of 845000,
2,3-diethyl-pyrazine with a peak at a minimum level of 144000,
2,5-diethyl-pyrazine with a peak at a minimum level of 159000,
2,6-diethyl-pyrazine with a peak at a minimum level of 1084647,
5-ethyl-2,3-dimethyl pyrazine with a peak at a minimum level of 359000,
2-methyl-3,5-diethyl pyrazine with a peak at a minimum level of 212000.

In another embodiment, claim 12, the invention deals with a baked foodstuff with an improved flavor according to any one of claims 1 to 3 characterised in that flavor active molecules in the baked foodstuff comprise 2,5-di-methyl-4-hydroxy-3[2H]-furanone, 5-methylfurfural, 1,2-diacetyl-ethylene, ethyl-pyrazine, 2-ethyl-6-methyl pyrazine, 2-ethyl-5-methyl pyrazine, 2,3-diethyl-pyrazine, 2,5-diethyl-pyrazine, 2,6-diethyl-pyrazine, 5-ethyl-2,3-dimethyl pyrazine, 2-methyl-3,5-diethyl pyrazine, diacetyl, and 2-acetyl-1-pyrroline.

In another embodiment, the invention deals with a baked foodstuff of claim 12 wherein the measurement of peak areas by GC-MS gives a minimum level of 50000 for the peak corresponding to 2,5-di-methyl-4-hydroxy-3[2H]-furanone and/or a minimum level of 10000 for the peak corresponding to 5-methylfurfural and/or a minimum level of 1000 for the peak corresponding to 1,2-diacetyl-ethylene and/or a minimum level of 90000 for the peak corresponding to ethyl-pyrazine and/or a minimum level of 50000 for the peak corresponding to 2-ethyl-6-methyl pyrazine and/or a minimum level of 35000 for the peak corresponding to 2-ethyl-5-methyl pyrazine and/or a minimum level of 5000 for the peak corresponding to 2,3-diethyl-pyrazine and/or a minimum level of 3000 for the peak corresponding to 2,5-diethyl-pyrazine and/or a minimum level of 11000 for the peak corresponding to 2,6-diethyl-pyrazine and/or a minimum level of 12000 for the peak corresponding to 5-ethyl-2,3-dimethyl pyrazine and/or a minimum level of 4000 for the peak corresponding to 2-methyl-3,5-diethyl pyrazine and/or a minimum level of 55000 for the peak corresponding to diacetyl and/or a minimum level of 1000 for the peak corresponding to 2-acetyl-1-pyrroline.

In another embodiment, the invention deals with a baked foodstuff of claim 12 wherein the measurement of peak areas by GC-MS gives a minimum level of 50000 for the peak corresponding to 2,5-di-methyl-4-hydroxy-3[2H]-furanone a minimum level of 10000 for the peak corresponding to 5-methylfurfural a minimum level of 1000 for the peak corresponding to 1,2-diacetyl-ethylene a minimum level of 90000 for the peak corresponding to ethyl-pyrazine a minimum level of 50000 for the peak corresponding to 2-ethyl-6-methyl pyrazine a minimum level of 35000 for the peak corresponding to 2-ethyl-5-methyl pyrazine a minimum level of 5000 for the peak corresponding to 2,3-diethyl-pyrazine a minimum level of 3000 for the peak corresponding to 2,5-diethyl-pyrazine a minimum level of 11000 for the peak corresponding to 2,6-diethyl-pyrazine a minimum level of 12000 for the peak corresponding to 5-ethyl-2,3-dimethyl pyrazine a minimum level of 4000 for the peak corresponding to 2-methyl-3,5-diethyl pyrazine a minimum level of 55000 for the peak corresponding to diacetyl and a minimum level of 1000 for the peak corresponding to 2-acetyl-1-pyrroline.

In another embodiment, the invention deals with a baked foodstuff according to any of claims 1 to 14 wherein the improved flavor comprises at least of the of the flavor characteristics: biscuit, buttery, fruity, nutty, caramel, golden syrup, honey, toasted, roasted bread-like and baked.

In another embodiment, the invention deals with a baked foodstuff according to any of claims 1 to 15 wherein the baked foodstuff exhibits improved texture.

In another embodiment, the invention deals with a baked foodstuff according to any of claims 1 to 16 wherein the baked foodstuff comprises cereal flour.

In another embodiment, the invention deals with a baked foodstuff according to claim 17 wherein the cereal flour is wheat flour.

In another embodiment, the invention deals with a baked foodstuff of any of claims 1 to 16 wherein the baked foodstuff is wafer, extruded cereal or biscuit.

In another embodiment, the invention deals with a baked foodstuff of any of claims 1 to 19 wherein the cooking time of the foodstuff is shorter than 5 minutes, preferably less than 3 minutes.

In another embodiment, the invention deals with a baked foodstuff according to any of claims 1 to 20, wherein the flavor is generated by heating using an oven, wafer baking process, infra red heating system, steam heating system, extruder, microwave oven, radio frequency oven, retort, pasteurization system or any combination of these.

In a further embodiment the invention deals with a Confectionery product comprising the baked foodstuff according to any of claims 1 to 21.

In a further embodiment, the invention deals with a composition for generating a baked foodstuff with an improved flavor wherein said composition comprises non pre-reacted flavor precursors which react on heating to generate the flavors wherein said composition comprises:

| | |
|---|---|
| Flour | 100 parts |
| Water | from 5 to 200 parts |
| Amino acid(s) | 0.3 parts (preferably a range: from 0.01 to 1 part) |
| Reducing sugar(s) | 0.9 parts (preferably a range: from 0.05 to 100 parts) |

In a further embodiment, the invention deals with a composition according to claim 23 wherein the amino acid is selected from the group of ornithine, glycine, glutamine, citrulline, arginine, proline, histidine, cysteine and mixtures thereof and the reducing sugar is selected from the group of fructose, glucose, xylose, tagatose, rhamnose, maltose, lactose, fucose, arabinose, galactose and mixtures thereof.

In a further embodiment, the invention deals with a composition according to claim 24 wherein the
a) amino acid is proline and the reducing sugar rhamnose, or
b) amino acid is histidine and the reducing sugar rhamnose, or
c) amino acid is histidine and the reducing sugar xylose, or
d) amino acid is proline and the reducing sugar xylose, or
e) amino acid is ornithine and the reducing sugar rhamnose, or
f) amino acid is ornithine and the reducing sugar xylose, or
g) amino acid is glutamine and the reducing sugar rhamnose, or
h) amino acid is glutamine and the reducing sugar xylose, or
i) amino acid is cysteine and the reducing sugar rhamnose, or
j) amino acid is cysteine and the reducing sugar xylose, or
k) amino acids are glutamine and ornithine and the reducing sugar rhamnose, or
l) amino acids are glutamine and ornithine and the reducing sugar xylose.

In a further embodiment, the invention deals with a process for producing a foodstuff according to any one of claims 1-21 comprising the step of adding to said foodstuff the composition according to anyone of claims 23-25.

In a further embodiment, the invention deals with a baked foodstuff according to claim 1 characterised in that flavor active molecules in the baked foodstuff additionally comprise 1,2-diacetyl-ethylene, ethyl-pyrazine, 2-ethyl-6-methyl pyrazine, 2-ethyl-5-methyl pyrazine, 2,3-diethyl-pyrazine, 2,5-diethyl-pyrazine, 2,6-diethyl-pyrazine, 5-ethyl-2,3-dimethyl pyrazine and 2-methyl-3,5-diethyl pyrazine, wherein the ratio of peak areas measured by GC-MS for the baked foodstuff to the peak areas of a wafer prepared from a batter having the following formulation:

| | |
|---|---|
| Flour | 100.0 parts |
| Water | 120 to 180 parts, preferably 160.0 parts |
| Sucrose | 0 to 4.0 parts, preferably 2.0 parts |
| Fat | 0.5 to 2.0 parts, preferably 1.0 parts |
| Lecithin | 0.1 to 1 parts, preferably 0.2 parts |
| Sodium bicarbonate | 0.1 to 0.5 parts, preferably 0.2 parts |
| Salt | 0 to 0.6 parts, preferably 0.2 parts | and baked for between 1 and 3 minutes, preferably 2 minutes between two metal plates heated to between 140 to 180° C., preferably 160° C. gives a minimum ratio of 4 for the peak corresponding to 2,5-di-methyl-4-hydroxy-3[2H]-furanone and/or a minimum ratio of 7 for the peak corresponding to 5-methylfurfural and/or a minimum ratio of 1.5 for the peak corresponding to ethyl-pyrazine and/or a minimum ratio of 2 for the peak corresponding to 2-ethyl-6-methyl pyrazine and/or a minimum ratio of 1.5 for the peak corresponding to 2-ethyl-5-methyl pyrazine and/or a minimum ratio of 1.6 for the peak corresponding to 2,3-diethyl-pyrazine and/or a minimum ratio of 2 for the peak corresponding to 2,5-diethyl-pyrazine and/or a minimum ratio of 2.5 for the peak corresponding to 2,6-diethyl-pyrazine and/or a minimum ratio of 1.6 for the peak corresponding to 5-ethyl-2,3-dimethyl pyrazine and/or a minimum ratio of 2 for the peak corresponding to 2-methyl-3,5-diethyl pyrazine and/or a minimum ratio of 1.5 for the peak corresponding to diacetyl.

In a further embodiment, the invention deals with a baked foodstuff according to claim 1 wherein the concentration of 5-methylfurfural is greater than or equal to 0.1 µg/g and/or the concentration of ethyl-pyrazine is greater than or equal to 0.3 µg/g and/or the concentration of 2,3-diethyl-pyrazine is greater than or equal to 4 µg/kg and/or the concentration of diacetyl is greater than or equal to 2 µg/g.

In a further embodiment, the invention deals with a baked foodstuff according to claim 1 wherein the concentration of 5-methylfurfural is greater than or equal to 0.1 µg/g, the concentration of ethyl-pyrazine is greater than or equal to 0.1 µg/g, the concentration of 2,3-diethyl-pyrazine is greater than or equal to 2 µg/kg and the concentration of diacetyl is greater than or equal to 1.8 µg/g.

In a further embodiment, the invention deals with a baked foodstuff according to claim 1 wherein the concentration of 5-methylfurfural is greater than or equal to 0.1 µg/g, the concentration of ethyl-pyrazine is greater than or equal to 0.3 µg/g, the concentration of 2,3-diethyl-pyrazine is greater than or equal to 4 µg/kg and the concentration of diacetyl is greater than or equal to 2 µg/g.

In a further embodiment, the invention deals with a baked foodstuff according to claim 1 with an improved flavor characterised in that the flavor active molecules in the baked foodstuff comprise 5-methylfurfural at a minimum level of 0.9 µg/g, ethyl-pyrazine at a minimum level of 0.4 µg/g, 2,3-diethyl-pyrazine at a minimum level of 11 µg/kg and diacetyl at a minimum level of 14 µg/g.

In a further embodiment, the invention deals with a baked foodstuff according to claim 1 with an improved flavor characterised in that the flavor active molecules in the baked foodstuff comprise 5-methylfurfural at a minimum level of 2.7 µg/g, ethyl-pyrazine at a minimum level of 2.7 µg/g, 2,3-diethyl-pyrazine at a minimum level of 45 µg/kg and diacetyl at a minimum level of 10 µg/g.

In a further embodiment, the invention deals with a baked foodstuff according to claim 1 with an improved flavor characterised in that the flavor active molecules in the baked foodstuff comprise 5-methylfurfural at a minimum level of 0.2 µg/g, ethyl-pyrazine at a minimum level of 0.2 µg/g, 2,3-diethyl-pyrazine at a minimum level of 4.5 µg/kg and diacetyl at a minimum level of 3.8 µg/g.

In a further embodiment, the invention deals with a baked foodstuff according to claim 1 characterised in that the flavor active molecules in the baked foodstuff comprise 5-methylfurfural at a minimum level of 0.1 µg/g, ethyl-pyrazine at a minimum level of 0.1 µg/g, 2,3-diethyl-pyrazine at a minimum level of 1 µg/kg and diacetyl at a minimum level of 2 µg/g.

In a further embodiment, the invention deals with a baked foodstuff according to claim 1 with an improved flavor characterised in that the flavor active molecules in the baked foodstuff comprise 5-methylfurfural at a minimum level of 2.4 µg/g, ethyl-pyrazine at a minimum level of 1.1 µg/g, 2,3-diethyl-pyrazine at a minimum level of 80 µg/kg and diacetyl at a minimum level of 15 µg/g.

In a further embodiment, the invention deals with a baked foodstuff according to claim 1 with an improved flavor characterised in that the flavor active molecules in the baked foodstuff comprise 5-methylfurfural at a minimum level of 0.1 µg/g, ethyl-pyrazine at a minimum level of 0.1 µg/g, 2,3-diethyl-pyrazine at a minimum level of 2 µg/kg and diacetyl at a minimum level of 1 µg/g.

In a further embodiment, the invention deals with a baked foodstuff according to claim 1 with an improved flavor characterised in that the flavor active molecules in the baked foodstuff comprise 5-methylfurfural at a minimum level of 0.1 µg/g, ethyl-pyrazine at a minimum level of 0.1 µg/g, 2,3-diethyl-pyrazine at a minimum level of 2 µg/kg and diacetyl at a minimum level of 2.3 µg/g.

In a further embodiment, the invention deals with a baked foodstuff according to claim 1 characterised in that the flavor active molecules in the baked foodstuff comprise 5-methylfurfural at a minimum level of 2.5 µg/g, ethyl-pyrazine at a minimum level of 3.4 µg/g, 2,3-diethyl-pyrazine at a minimum level of 70 µg/kg and diacetyl at a minimum level of 9.3 µg/g.

In a further embodiment, the invention deals with a confectionery product comprising the baked foodstuff according to any of the embodiment above.

The baked foodstuff with an improved flavor according to the invention comprises 2,5-di-methyl-4-hydroxy-3[2H]-furanone, 5-methylfurfural, diacetyl, and 2-acetyl-1-pyrroline. These aroma compounds impart desirable flavor attributes to the baked foodstuff, particularly in combination where they provide a balanced flavor to the baked foodstuff. The exact nature of the flavor notes they provide depends on the relative concentrations, but examples of the desirable flavor attributes are biscuit, buttery, fruity, nutty, caramel, golden syrup, honey, toasted, roasted bread-like and baked. The aroma compounds serve to add organoleptic interest to the baked goods, and provide a particularly desirable flavor for baked foodstuffs which are used as components of confectionery products.

The baked foodstuff with an improved flavor according to the invention may valuably additionally comprise 1,2-di-acetyl-ethylene, ethyl-pyrazine, 2-ethyl-6-methyl pyrazine, 2-ethyl-5-methyl pyrazine, 2,3-diethyl-pyrazine, 2,5-diethyl-pyrazine, 2,6-diethyl-pyrazine, 5-ethyl-2,3-dimethyl pyrazine and 2-methyl-3,5-diethyl pyrazine.

These aroma compounds also impart desirable flavor attributes to the baked foodstuff, particularly in combination where they provide a balanced flavor to the baked foodstuff.

In particular, the baked foodstuff according to the invention comprises 5-methylfurfural, diacetyl, 2,5-di-methyl-4-hydroxy-3[2H]-furanone and 2-acetyl-1-pyrroline such that when the aroma compounds are measured by GC-MS there is a minimum level of 10000 for the peak corresponding to 5-methylfurfural, and/or a minimum level of 55000 for the peak corresponding to diacetyl, and/or a minimum level of 50000 for the peak corresponding to 2,5-di-methyl-4-hydroxy-3[2H]-furanone and/or a minimum level of 1000 for the peak corresponding to 2-acetyl-1-pyrroline.

As used herein and unless otherwise stated, measurement by GC-MS refers to the method of sample preparation, solid phase microextraction and GC-MS analysis described in example 2.

The baked foodstuff of the invention may be for example; cake, pastry, snack food, breakfast cereal, biscuits or cookies, dry petfood, pasteurized foodstuffs, retorted foodstuffs, microwaveable products, bread, crispbread, breadcrumbs, fried food, ready to re-heat frozen food items, and mixtures thereof.

In a preferred embodiment, the baked foodstuff of the invention may be baked components of confectionery.

The baked foodstuff of the invention may be produced by adding the composition of the invention to other ingredients and then heating e.g. by oven, wafer baking process, infra red heating system, steam heating, extrusion cooking, microwave cooking, radio frequency oven, retorting or during pasteurization.

Particularly good results are obtained on improved delivery of the flavors for confectionery products, and specially when the baked foodstuff is wafer, crackers or extruded cereal and/or when the baked foodstuff has a cooking time below 5 minutes, preferably below 3 minutes.

In a preferred embodiment the composition according to the invention is used in confectionery products, said composition being added to the ingredients of baked components of the confectionery before they are baked. For example the batter in the case of wafer, dough in the case of biscuits and the ingredient mixture for extruded cereal products.

Wafers are baked products which are made from wafer batter and have crisp, brittle and fragile consistency. They are thin, with an overall thickness usually between <1 and 4 mm and typical product densities range from 0.1 to 0.3 g/cm3. The surfaces are precisely formed, following the surface shape of the plates between which they were baked. They often carry a pattern on one surface or on both. Wafers may also be produced by extrusion, according to our European co-pending patent application No. 06018976.8.

Two basic types of wafer are described by K. F. Tiefenbacher in "Encyclopaedia of Food Science, Food Technology and Nutrition p 417-420—Academic Press Ltd London— 1993":

1) No- or low-sugar wafers. The finished biscuits contain from zero to a low percentage of sucrose or other sugars. Typical products are flat and hollow wafer sheets, moulded cones or fancy shapes.

2) High-sugar wafers. More than 10% of sucrose or other sugars are responsible for the plasticity of the freshly baked sheets. They can be formed into different shapes before sugar recrystallization occurs. Typical products are moulded and rolled sugar cones, rolled wafer sticks and deep-formed fancy shapes.

Extrusion-cooking of cereal-based compositions is commonly used in the food industry. It is described for the preparation of edible food product cups in U.S. Pat. No. 5,962,055, in the making of multiple, complexly patterned extrudates in U.S. Pat. No. 6,251,452 B1, in the manufacture of confectionery having coloured fine line (U.S. Pat. No. 6,579,555 B1). U.S. Pat. No. 6,054,166 further describes a process for making cooked snack by extrusion having a texture similar to traditional tortillas, crisps, or crackers. The common features of the extrusion processes include the step of forming an extrudable dough, which may be cooked in a single or a twin-screw extruder under high temperature, and which is then extruded through a die. Extrusion through a die may be accompanied by expansion, depending on the water content of the dough and depending on the pressure at the die. The product may then be cut and/or further processed and cooled.

It is also an object of the present invention to provide materials and methods for efficiently generating cooked flavors and aromas in foods which overcome the aforementioned problems.

According to the present invention there is provided a composition for generating a cooked flavor in a foodstuff, the composition comprising flavor precursors, which precursors are non pre-reacted flavor and which react during the cooking of the foodstuff to generate flavor within the foodstuff.

As used herein, the term "flavor" as applied to a foodstuff includes its aroma, and may refer in general terms to the organoleptic qualities of the foodstuff. Indeed, those skilled in the art will recognize that the perceived flavor of any given food depends to a large extent on its aroma.

As used herein, the term "flavor precursor" is intended to define compounds or chemical moieties which can take part in one or more reactions which yield products which contribute to the generation of flavor in a food. Such flavor precursors therefore need not be flavoring compounds per se.

Thus, the compositions of the invention are activated within the foodstuff, and so generate flavor compounds in situ. This improves the distribution of the flavor/aroma compounds throughout the foodstuff and ensures that volatiles (and other "top notes") are more effectively introduced into the flavor profile.

The precursors selected for use in the invention are such that they give rise to a satisfactorily broad range of products after entry into the Maillard reaction. This leads to a particularly rich flavor profile in the food. The precursors for use in the invention may be in powder form, but preferably the precursors are dissolved/dispersed in water and mixed into the ingredients of the baked goods.

The composition of the invention comprises a combination of at least one amino acid with at least one sugar or sugar alcohol. Preferably the composition of the invention comprises a combination of at least one amino acid with at least one reducing sugar. Examples of suitable amino acids are ornithine, glycine, glutamine, citrulline, arginine, proline, histidine, cysteine or mixtures thereof. Examples of suitable reducing sugars are fructose, glucose, xylose, tagatose, rhamnose, maltose, lactose, fucose, arabinose, galactose or mixtures thereof.

In another preferred embodiment of the invention the amino acid is ornithine and the reducing sugar is xylose. In another preferred embodiment of the invention the amino acid is ornithine and the reducing sugars is rhamnose. In another preferred embodiment of the invention the amino acid is proline and the reducing sugars is rhamnose. In another preferred embodiment of the invention the amino acid is histidine and the reducing sugar is rhamnose. In another preferred embodiment of the invention the amino acid is glutamine and the reducing sugars is rhamnose.

The flavor generated by the compositions of the invention may be biscuit, buttery, fruity, nutty, caramel, bread-like, golden syrup, honey, toasted, roasted and baked.

The composition of the invention may be used with the ingredients of any foodstuff, for example; baked components of confectionery, breadcrumbs, dry petfood, pasteurized foodstuffs, retorted foodstuffs, microwaveable products, bread, snack food and mixtures thereof.

The composition of the invention is typically prepared by mixing the at least one amino acid with the at least one reducing sugar. These can be dry powders, or dissolved/dispersed in water. Preferably the at least one amino acid and the at least one reducing sugar are mixed together with the ingredients of baked goods before the ingredients are baked. It will be appreciated that some baked foodstuffs typically include reducing sugars as an ingredient. For example, Brandy Snaps are usually made with Golden Syrup in a one-to-one ratio with the flour. Typically, about 50% of Golden Syrup is invert syrup (glucose and fructose). A typical composition of the invention comprises:

| | | |
|---|---|---|
| Flour | 100 | parts |
| Water | from 5 to 200 | parts |
| Amino acid(s) | from 0.01 to 1 | part, more preferably from 0.03 to 0.70 parts, most preferably from 0.03 to 0.66 parts |
| Reducing sugar(s) | from 0.05 to 100 | parts, more preferably from 0.09 to 5 parts, most preferably from 0.09 to 2 parts |

Many baked foodstuffs contain yeast which in some cases can influence flavor formation. The compositions of this invention can be used in baked foodstuffs with or without yeast, or where the only yeast ingredient is *Saccharomyces cerevisiae*.

In one embodiment of the invention the at least one amino acid and the at least one reducing sugar are mixed with the ingredients of a ready to bake product which is then frozen to be baked at a later time.

It is also contemplated that the at least one amino acid and at least one reducing sugar may be partially pre-reacted. That is to say, reacted by one of the methods known in the art to generate flavor active molecules, but for temperatures and times which do not completely react away the amino acids and reducing sugars. This provides the benefit of using precisely controlled conditions to manipulate the formation of desirable flavor active molecules, but permits the remaining flavor pre-cursors in the mixture also to take part in flavor generating reactions during the cooking process.

In another aspect, the invention contemplates a process for producing a foodstuff comprising the step of adding to a foodstuff the composition of the invention (for example by dusting or by inclusion, optionally followed by heating (e.g. by convection oven, impingement oven, wafer baking, infra red heating, steam heating, extrusion cooking, microwave cooking, retorting or during pasteurization.)

The baked foodstuff of the invention also exhibits improved texture, especially increased crispness.

Crispness is an attribute that relates to the number of mechanical fractures that occur upon application of a certain force and to the magnitude of the force needed to cause a fracture. Ways to quantify crispness are known in the art, notably from Mitchell, J. R. et al. in Journal of the Science of Food and Agriculture, 80, 1679-1685, 2000. Thus, crispness can be quantified by a number of parameters.

In the case of wafer, it is possible to measure crispness using a crush test (described in example 2). This measures the force needed to fracture a wafer. The test uses a cylindrical probe having a 4 mm diameter and a flat face for penetrating the wafer.

By applying a force onto the wafer with the probe, microfractures occur until the wafer can no longer be crushed. These fractures are related to the crispness perception when eating the product.

Referring to FIG. 3 showing a typical crush test force diagram, it can be seen that each time a microfracture occurs, a force drop is observed in the force applied to the wafer (indicated by arrows on FIG. 3). How many force drops occur in a specified distance (mm) and the magnitude of the force drops are indicative of the crispness of the wafer.

It has been determined that force drops greater than 0.2 N in magnitude but less than 0.6 N are especially relevant to the assessment of crispness as they provide a good correlation to the sensory perception of crispness, notably to the acoustics associated with crispness.

Thus, by selecting the force drops which are greater than 0.2 N in magnitude (number of force drops $\alpha$) and then selecting the force drops which are greater than 0.6 N in magnitude (number of force drops $\beta$) and subtracting $\beta$ from $\alpha$, it is possible to establish a number of force drops between 0.2 N and 0.6 N, per mm of distance traveled by the crush test probe.

This is illustrated in FIG. 4, wherein several wafers are compared. A wafer formulated without an amino acid and a reducing sugar (wafer A) exhibit fewer force drops per mm than the same recipe but with added amine and reducing sugar (wafers C-I). That is to say wafer A is less crisp. The effect is an additional benefit to the flavor impact and is equivalent to adding extra sugar into the wafer batter (wafer B), but without the effect of extra sweetness which can be undesirable.

FIGURES

FIG. 1 illustrates gas chromatography-olfactometry (GC-O) of a wafer not of the invention (Wafer A). The figure shows a gas chromatography-mass spectrometry (GC-MS) trace (mass spectrometer total ion response plotted against time in minutes) annotated at the corresponding time with descriptions of aroma recorded by human sniffers.

The descriptions are numbered as follows

| N° | Odour description |
|---|---|
| 1 | green, earthy |
| 2 | biscuit |
| 4 | floral, fresh |
| 4 | chemical, solvent |

FIG. 2 illustrates gas chromatography-olfactometry (GC-O) of a wafer of the invention (Wafer D). The figure shows a gas chromatography-mass spectrometry (GC-MS) trace (mass spectrometer total ion response plotted against time in minutes) annotated at the corresponding time with descriptions of aroma recorded by human sniffers.

The descriptions are numbered as follows

| N° | Odour description |
|---|---|
| 5 | floral, fruity |
| 6 | bread, fruit bread, baked |
| 7 | bread, biscuit |
| 8 | green, earthy |
| 9 | biscuit, bread, baked |
| 10 | caramel, candy |
| 11 | caramel |
| 12 | burnt sugar |

EXAMPLES

Figure 1:
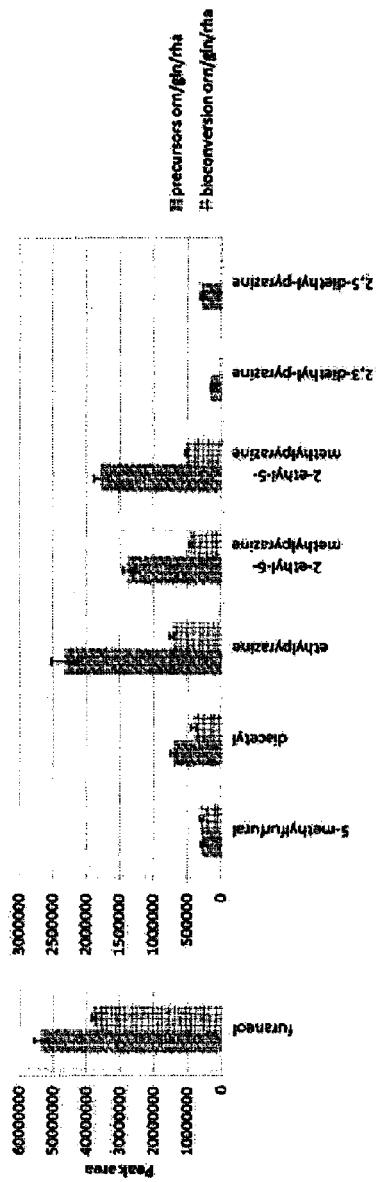

The following examples further illustrate the present invention.

Example 1

Preparation of Wafers

A series of 11 different wafers A-J were produced.

For Wafer A, a batter was prepared having the following formulation:

| | |
|---|---|
| Flour | 100.0 parts |
| Water | 160.0 parts |
| Sucrose | 2.0 parts |
| Fat | 1.0 parts |
| Lecithin | 0.2 parts |
| Sodium bicarbonate | 0.2 parts |

For Wafer B, the batter composition was:

| | |
|---|---|
| Flour | 100.0 parts |
| Water | 160.0 parts |
| Sucrose | 5.0 parts |
| Fat | 1.0 parts |
| Lecithin | 0.2 parts |
| Sodium bicarbonate | 0.2 parts |

For Wafers C-J, the batter composition was:

| | |
|---|---|
| Flour | 100.0 parts |
| Water | 160.0 parts |
| Sucrose | 2.0 parts |
| Fat | 1.0 parts |
| Lecithin | 0.2 parts |
| Sodium bicarbonate | 0.2 parts |
| Amino acid | 0.3 parts |
| Reducing sugar | 0.9 parts |

The amino acids and reducing sugars were added as powders and mixed with the other batter ingredients. The specific amino acids and reducing sugars used for wafers C-J were as follows:

| Wafer recipe | Amino acid | Reducing Sugar |
|---|---|---|
| C | proline | Rhamnose |
| D | histidine | Rhamnose |
| E | histidine | xylose |
| F | proline | xylose |
| G | ornithine | rhamnose |
| H | ornithine | xylose |
| I | glutamine | xylose |
| J | glutamine | rhamnose |

Wafers were prepared by baking the batters for 2 minutes in an oven (25-plate wafer oven, Hebenstreit Moerfelded, West Germany) between two metal plates heated to 160° C.

Example 2

Chemical Analysis of the Wafers

Wafers A-J produced in example 1, were analysed by gas chromatography coupled with mass spectrometry detection (GC_MS). In addition, commercially available wafers KNISTERBROT® (3 Pauly®) and HANUTA® (Ferrero®) (purchased in Germany in April 2007) were also analysed. The results are tabulated in Table 1.

Equipment:
- 20 mL vials for headspace analysis, Agilent Technologies 5182-0837.
- 10 mL vials for headspace analysis, Supelco 33143.
- 20 mm crimp caps, Agilent Technologies 9301-0718 with PTFE/white silicone septa, Agilent Technologies 9301-0719.
- SPME fibre, 65 µm, PDMS-DVB, Supelco 57310-U, blue.
- Multi-block heater, Lab-Line Instruments, model 2050-ICE
- GC-MS system: Agilent Technologies model 6890 N equipped with split-splitless injector including a SPME liner, 0.75 mm ID (Supelco 2-6375,01) and a 5973 N mass detector.
- GC capillary column: J&W Scientific, DB-WAX, 30 m, 0.32 mm ID, 0.25 µm coating.

Standards:

Four aroma molecules were quantified using authentic standards (standards for the other molecules not being commercially available). Aqueous solutions were prepared according to the following table:

| | Dilutions [µg/ml] | | | | |
|---|---|---|---|---|---|
| | 1 | 2 | 3 | 4 | 5 |
| Diacetyl, Aldrich B85307 | 10 | 20 | 30 | 40 | 50 |
| Ethyl-pyrazine, Aldrich 250384 | 3 | 6 | 9 | 12 | 15 |
| 2,3-diethyl-pyrazine, Aldrich 292982 | 0.12 | 0.24 | 0.36 | 0.48 | 0.60 |
| 5-methyl-furfural Aldrich 13,731-6 | 2 | 4 | 6 | 8 | 10 |

Solid Phase Microextraction (SPME)

Wafer sample was crushed with pestle and mortar just before analysis. 200 mg of the powdered wafer were introduced into a 20 mL vial and suspended into 5 mL of 25% NaCl. A stirring magnet was added and the vial was immediately sealed by a septum. The slurry was stirred at 500 rpm and at room temperature. After equilibration for 1 hour, the SPME fibre was exposed to the headspace, for again 1 hour while temperature and stirring were maintained, before injection into the GC system.

Quantification was performed spiking wafers with 5 different levels of standard molecules. This was done adding 50 µl of the standard solution to the 200 mg of powdered wafer in the sampling procedure above. All wafer samples were treated in this way, all showing linear relation of peak area as a function of the added amount of standard compounds. However the slopes of the linear straight lines varied, indicating changes in the air/water partition and/or preferential adsorption onto the SPME fiber depending on the global aroma composition of each wafer. Consequently, each individual wafer sample was analyzed using its own calibration.

Spiking with standard solutions was used to determine a linear regression of peak area as a function of the concentration of the added aroma compound. Initial concentration in 5-methyl-furfural, ethyl-pyrazine, 2,3-diethyl-pyrazine or diacetyl was then calculated using the equation:

$$[X] = \frac{\text{Peak area}}{a} \text{ or } [DEP] = \frac{\text{Peak area} \cdot 1000}{a}$$

Where:
[X] is the concentration of 5-methyl-furfural, ethyl-pyrazine, or diacetyl, expressed as µg/g
[DEP] is the concentration of 2,3-diethyl-pyrazine, expressed as µg/kg
Peak area is the peak area of the corresponding aroma molecule
a is the slope of linear straight line The results of the quantification of 5-methyl-furfural (MF), ethyl-pyrazine (EP), 2,3-diethyl-pyrazine (DEP) or diacetyl (D) are summarized in the following table:

| Sample | MF [μg/g] | EP [μg/g] | DEP [μg/kg] | D [μg/g] |
|---|---|---|---|---|
| A | 0.0 ± 0.0 | 0.3 ± 0.1 | 8 ± 5 | 2.8 ± 0.5 |
| B | 0.0 ± 0.0 | 0.1 ± 0.1 | 4 ± 2 | 2.2 ± 1.0 |
| C | 1.1 ± 0.1 | 0.5 ± 0.0 | 14 ± 2 | 15.4 ± 0.5 |
| D | 3.0 ± 0.2 | 3.0 ± 0.2 | 72 ± 19 | 14.5 ± 3.2 |
| E | 0.4 ± 0.1 | 0.4 ± 0.1 | 5 ± 0 | 4.1 ± 0.8 |
| F | 0.1 ± 0.0 | 0.1 ± 0.0 | 2 ± 2 | 3.0 ± 3.9 |
| G | 2.7 ± 0.2 | 1.4 ± 0.2 | 96 ± 4 | 16.4 ± 1.1 |
| H | 0.1 ± 0.0 | 0.2 ± 0.0 | 3 ± 1 | 1.8 ± 1.9 |
| I | 0.2 ± 0.0 | 0.2 ± 0.0 | 3 ± 1 | 2.9 ± 0.4 |
| J | 3.2 ± 0.5 | 4.0 ± 0.4 | 138 ± 49 | 10.1 ± 0.5 |
| Knisterbrot ® | 0.0 ± 0.0 | 0.0 ± 0.0 | 1 ± 1 | 0.3 ± 0.2 |
| Hanuta ® | 0.0 ± 0.0 | 0.2 ± 0.1 | 3 ± 1 | 1.8 ± 2.1 |

The analysis for 2,5-di-methyl-4-hydroxy-3[2H]-furanone was made by SPME of dry wafer as 2,5-di-methyl-4-hydroxy-3[2H]-furanone is a polar molecule and would not be readily extracted from the aqueous phase. In this case, 2 g of powdered wafer were introduced into a 10 mL vial. After sealing, the latter was thermostated at 70° C. without any stirring. After equilibration for 1 hour, the SPME fibre was exposed to the headspace, for again 1 hour while temperature and stirring were maintained, before injection into the GC system.

GC-MS Analysis

Manual injection was performed introducing the fibre into the injector set at 220° C. Splitless mode was used with a purge after 3 min at a flow rate of 50 mL/min. After 5 min, the fibre was removed from the injector and immediately exposed to the next sample. The oven temperature gradient started with a delay of 5 min, from 20° C. to 220° C. at a rate of 4° C./min. The final temperature was hold for another 5 min period. Helium was used as carrier gas at a constant flow of 1.5 mL/min. the mass spectrometer was operated in electron impact mode at 70 eV, with transfer line and source temperatures of 150° C. and 230° C. respectively. Masses were scanned from 20 to 400 Da. Specific ion chromatograms were then extracted for each individual aroma molecule, according to the following list:

| Aroma molecule | Specific ion m/e | Retention time [min] |
|---|---|---|
| 5-methyl-furfural | 110 | 27.6 |
| 1,2-diacetyl-ethylene | 97 | 29.1 |
| ethyl-pyrazine | 107 | 20.0 |
| 2-ethyl-6-methyl pyrazine | 121 | 21.8 |
| 2-ethyl-5-methyl pyrazine | 121 | 22.0 |
| 2,3-diethyl-pyrazine | 121 | 24.1 |
| 2,5-diethyl-pyrazine | 121 | 24.2 |
| 2,6-diethyl-pyrazine | 135 | 23.4 |
| 5-ethyl-2,3-dimethyl pyrazine | 135 | 24.3 |
| 2-methyl-3,5-diethyl pyrazine | 149 | 25.4 |
| Diacetyl | 43 | 6.8 |
| 2-acetyl-1-pyrroline | 83 | 20.1 |
| 2,5-di-methyl-4-hydroxy-3[2H]-furanone* | 128 | 32.1 |

*analyzed by SPME of dry wafer

As an example of how to read Table 1, it can be seen that for wafer E (the ingredients of which comprised histidine and xylose) the amount of 5-methyl-furfural is quantified by a peak area of 53512 based on the mass spectrometer response for the ion m/e=110. The peak had a retention time of 27.6 minutes. By comparison, KNISTERBROT wafer had a lower amount of 5-methyl-furfural with a peak area of 4872.

For each wafer, the ratio of peak area to the corresponding peak area for wafer A was calculated for each aroma molecule. These ratios are presented in Table 2. As an example of how to read Table 2, it can be seen that for wafer E (the ingredients of which comprised histidine and xylose) the amount of 5-methyl-furfural is quantified by peak area ratio as 59 times higher than in Wafer A based on the mass spectrometer response for the ion m/e=110. The peak had a retention time of 27.6 minutes. By comparison, KNISTERBROT wafer had only 6.4 times more of 5-methyl-furfural than Wafer A.

Example 3

Examination of Wafers by Gas Chromatography-Olfactometry

Wafers A and D of example 1 were also analysed by Gas Chromatography-Olfactometry (GC-O). The analysis was carried out in a similar manner to the GC-MS, except that an odour port supplied with humidified air (SGE, ODO-1) was substituted for the Agilent 5973 N mass spectrometer and extra wafer was used to ease detection by human sniffers. Wafer was ground to a powder using a mechanical grinder. In this case, wafer powder (2 g) was weighed into a 20 ml crimp-top headspace vial and 1 g of saturated sodium chloride solution was added. Each vial was equilibrated for 60 min at 55° C. and the headspace volatiles adsorbed onto a PDMS-DVB SPME fibre (Supelco) for 30 min, again at 55° C. The volatiles were desobed for 5 min at 220° C. in the injector of an Agilent 6890 GC in splitless mode, and separated on a 60 m×0.25 mm i.d DB-Wax column (J&W) using the following conditions: 40° C. (5 min)-230° C. (10 min) at 3° C. min-1. Trained subjects ("Sniffers") sniffed compounds eluting from the end of the GC-column and recorded their comments together with the time at which the odours were perceived.

A CombiPal (CTC Analytics) was used to automate the equilibration, adsorption and desorption processes.

This process was repeated with column outlet connected to an Agilent 5793 N mass spectrometer. Eluting compounds were fragmented by electron impact ionisation (EI). Peaks were detected using Agilent GC-MS data analysis software. Identification of components was by comparison of fragmentation patterns to those of spectral libraries such as NIST05.

Reference materials of known identity were injected into both GC-O and GC-MS instruments in order to calibrate for any time differences associated with the high vacuum of the mass spectrometer and to allow correlation between the compounds detected and their individual odours. Such analyses have been performed a minimum of two times.

Figure 2:
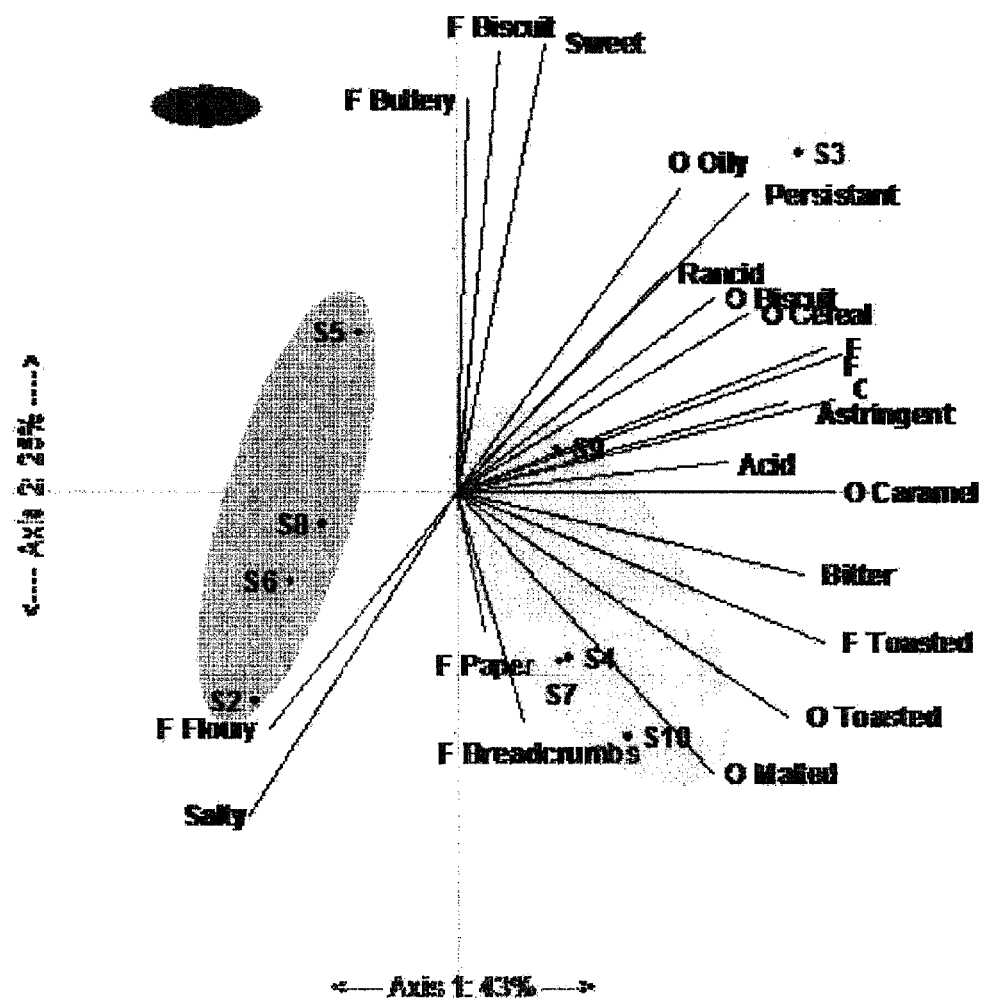

FIGS. 1 and 2 shows the GC-MS trace (mass spectrometer total ion response plotted against time in minutes) annotated at the corresponding time with the descriptions of aroma recorded by the Sniffers. FIG. 1 is the result for Wafer A and FIG. 2 for Wafer D. It is worth noting that the proximity of a description to a prominent peak does not necessarily mean that the aroma being described comes from that peak. The sensitivity of the human nose is different to the sensitivity of the mass spectrometer and so very small peaks on the GC-MS trace may provide a strong aroma and conversely large peaks on the GC-MS trace may not have a discernable aroma. It is also worth noting that the retention times for the peaks in FIG. 1 are not directly comparable with those in example 2 (Table 1) as a different length column and GC oven temperature conditions have been used.

Example 4

Texture Analysis of Wafers by Crush Test

The wafers produced in example 1 were analyzed by a crush test

Figure 3:
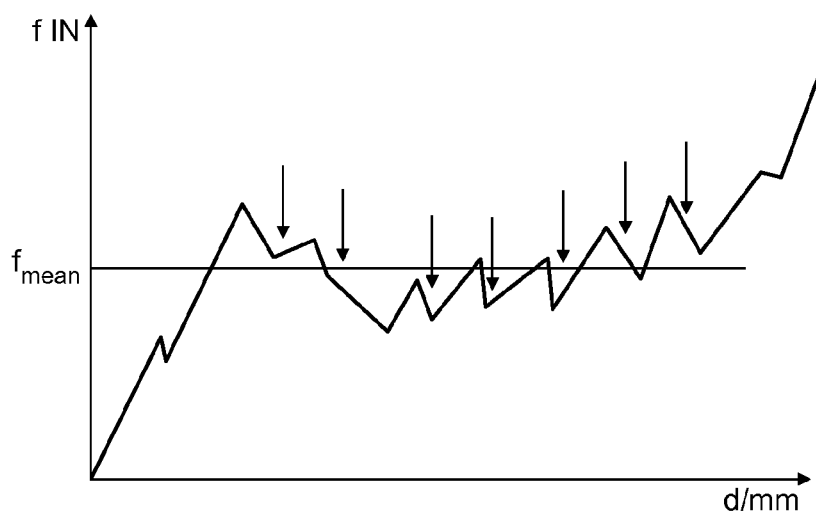
FIG. 3 is a graph illustrating a typical force variation during a crush test. Such a test is described in detail herein.

Sample: wafer of at least 2 cm².
Measurements were repeated for 10 samples of each product type and an average was taken.
Instrument: Stable Micro Systems TA-XTplus
Penetration probe: 4 mm diameter cylinder (Stable Micro Systems P/4)
Instrument settings:
 Compression mode
 Test speed: 1 mm s-1
 Target strain: 90%
 Trigger force: 0.5 N
Analysis:

The force/distance curve (FIG. 3) looks jagged because the force drops each time a fracture occurs; these fractures are related to the crispness perception when eating the product. At the end of the test the force rises sharply due to densification of the sample. The analysis macro calculates the average force for the whole test. It then selects a region for analysis from when the probe first contacts the sample to when the force first rises above the average value (this is to avoid including the densification region of the curve in the analysis). The macro then counts the number of force drops (i.e. negative peaks) above a threshold of 0.2 N and the number of force drops above a threshold of 0.6 N. The operator then subtracts one value from the other to give the number of force drops between 0.2 N and 0.6 N (these thresholds were chosen on the basis of good correlation to sensory perception of crispness). The number of force drops in the analysis region is normalised by dividing through by the distance traveled in the analysis region, to give the number of force drops per unit distance.

Figure 4:
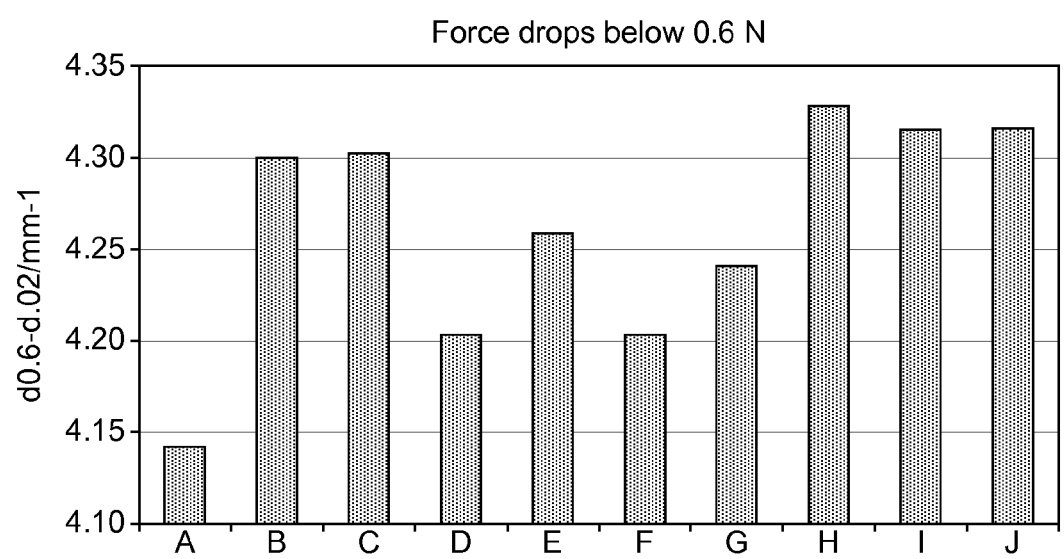
FIG. 4 illustrates the crush test measurements of force drops per mm for a variety of wafers including the wafers of the invention. Measurements of force drops between 0.2 N and 0.6 N are considered representative for crispness.

FIG. 4 shows the data obtained for the wafers. It can be seen that the wafer with no amino acid or reducing sugar (Wafer A) has a lower crispness than the other samples.

What is claimed is:

1. A baked foodstuff with an improved flavor comprising a flavor active molecule in the baked foodstuff comprising 2,5-di-methyl-4-hydroxy-3[2H]-furanone, 5-methylfurfural, diacetyl, and 2-acetyl-1-pyrroline, the measurement of peak areas by GC-MS giving a minimum level of 50000 for the peak corresponding to 2,5-di-methyl-4-hydroxy-3[2H]-furanone, a minimum level of 10000 for the peak corresponding to 5-methylfurfural, a minimum level of 55000 for the peak corresponding to diacetyl and a minimum level of 1000 for the peak corresponding to 2-acetyl-1-pyrroline.

2. A baked foodstuff with an improved flavor comprising flavor active molecules in the baked foodstuff comprising:
 2,5-di-methyl-4-hydroxy-3[2H]-furanone, 5-methylfurfural, diacetyl, and 2-acetyl-1-pyrroline wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 55000 for the peak corresponding to diacetyl, 1000 for the peak corresponding to 2-acetyl-1-pyrroline;
 and at least one of the following flavors having a peak areas by GC-MS of:
 1,2 Diacetylethylene, with a peak at a minimum level of 109000,
 Ethylpyrazine, with a peak at a minimum level of 149000,
 2-ethyl-6-methylpyrazine with a peak at a minimum level of 47000,
 2-ethyl-5-methylpyrazine with a peak at a minimum level of 72000,
 2,3-diethyl-pyrazine with a peak at a minimum level of 11000,
 2,5-diethyl-pyrazine with a peak at a minimum level of 17000,
 2,6-diethyl-pyrazine with a peak at a minimum level of 37000,
 5-ethyl-2,3-dimethylpyrazine with a peak at a minimum level of 32000, and
 2-methyl-3,5-diethyl pyrazine with a peak at a minimum level of 16000.

3. A baked foodstuff with an improved flavor comprising flavor active molecules in the baked foodstuff comprising:
 2,5-di-methyl-4-hydroxy-3[2H]-furanone, 5-methylfurfural, diacetyl, and 2-acetyl-1-pyrroline wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 55000 for the peak corresponding to diacetyl, 1000 for the peak corresponding to 2-acetyl-1-pyrroline;
 and at least one of the following flavors having a peak areas by GC-MS of:
 1,2 Diacetylethylene, with a peak at a minimum level of 327000,
 Ethylpyrazine, with a peak at a minimum level of 933000,
 2-ethyl-6-methylpyrazine with a peak at a minimum level of 236000,
 2-ethyl-5-methylpyrazine with a peak at a minimum level of 598000,
 2,3-diethyl-pyrazine with a peak at a minimum level of 49000,
 2,5-diethyl-pyrazine with a peak at a minimum level of 148000,
 2,6-diethyl-pyrazine with a peak at a minimum level of 241000,
 5-ethyl-2,3-dimethylpyrazine with a peak at a minimum level of 175000, and
 2-methyl-3,5-diethyl pyrazine with a peak at a minimum level of 164000.

4. A baked foodstuff with an improved flavor comprising flavor active molecules in the baked foodstuff comprising:
 2,5-di-methyl-4-hydroxy-3[2H]-furanone, 5-methylfurfural, diacetyl, and 2-acetyl-1-pyrroline wherein the measurement of peak areas by GC-MS gives a minimum level of 50000 for the peak corresponding to 2,5-di-methyl-4-hydroxy-3[2H]-furanone, 10000 for the peak corresponding to 5-methylfurfural, 55000 for the peak corresponding to diacetyl, 1000 for the peak corresponding to 2-acetyl-1-pyrroline;
 and at least one of the following flavors having a peak areas by GC-MS of:
 1,2 Diacetylethylene, with a peak at a minimum level of 54000,
 Ethylpyrazine, with a peak at a minimum level of 148000,
 2-ethyl-6-methylpyrazine with a peak at a minimum level of 146000,
 2-ethyl-5-methylpyrazine with a peak at a minimum level of 141000,
 2,3-diethyl-pyrazine with a peak at a minimum level of 4000,
 2,5-diethyl-pyrazine with a peak at a minimum level of 4000,
 2,6-diethyl-pyrazine with a peak at a minimum level of 14000,
 5-ethyl-2,3-dimethylpyrazine with a peak at a minimum level of 46000, and
 2-methyl-3,5-diethyl pyrazine with a peak at a minimum level of 16000.

5. A baked foodstuff with an improved flavor comprising flavor active molecules in the baked foodstuff comprising:
  2,5-di-methyl-4-hydroxy-3[2H]-furanone, 5-methylfurfural, diacetyl, and 2-acetyl-1-pyrroline wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 55000 for the peak corresponding to diacetyl, 1000 for the peak corresponding to 2-acetyl-1-pyrroline;
  and at least one of the following flavors having a peak areas by GC-MS of:
  1,2 Diacetylethylene, with a peak at a minimum level of 7000,
  Ethylpyrazine, with a peak at a minimum level of 20000,
  2-ethyl-6-methylpyrazine with a peak at a minimum level of 24000,
  2-ethyl-5-methylpyrazine with a peak at a minimum level of 12000,
  2,3-diethyl-pyrazine with a peak at a minimum level of 800,
  2,5-diethyl-pyrazine with a peak at a minimum level of 200,
  2,6-diethyl-pyrazine with a peak at a minimum level of 1600,
  5-ethyl-2,3-dimethylpyrazine with a peak at a minimum level of 5500, and
  2-methyl-3,5-diethyl pyrazine with a peak at a minimum level of 800.

6. A baked foodstuff with an improved flavor comprising flavor active molecules in the baked foodstuff comprising:
  2,5-di-methyl-4-hydroxy-3[2H]-furanone, 5-methylfurfural, diacetyl, and 2-acetyl-1-pyrroline wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 55000 for the peak corresponding to diacetyl, 1000 for the peak corresponding to 2-acetyl-1-pyrroline;
  and at least one of the following flavors having a peak areas by GC-MS of:
  1,2 Diacetylethylene, with a peak at a minimum level of 110000,
  Ethylpyrazine, with a peak at a minimum level of 415000,
  2-ethyl-6-methylpyrazine with a peak at a minimum level of 201000,
  2-ethyl-5-methylpyrazine with a peak at a minimum level of 514000,
  2,3-diethyl-pyrazine with a peak at a minimum level of 78000,
  2,5-diethyl-pyrazine with a peak at a minimum level of 148000,
  2,6-diethyl-pyrazine with a peak at a minimum level of 127000,
  5-ethyl-2,3-dimethylpyrazine with a peak at a minimum level of 122000, and
  2-methyl-3,5-diethyl pyrazine with a peak at a minimum level of 145000.

7. A baked foodstuff with an improved flavor comprising flavor active molecules in the baked foodstuff comprising:
  2,5-di-methyl-4-hydroxy-3[2H]-furanone, 5-methylfurfural, diacetyl, and 2-acetyl-1-pyrroline wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 55000 for the peak corresponding to diacetyl, and 1000 for the peak corresponding to 2-acetyl-1-pyrroline;
  and at least one of the following flavors having a peak areas by GC-MS of:
  1,2 Diacetylethylene, with a peak at a minimum level of 7000,
  Ethylpyrazine, with a peak at a minimum level of 58000,
  2-ethyl-6-methylpyrazine with a peak at a minimum level of 106000,
  2-ethyl-5-methylpyrazine with a peak at a minimum level of 50000,
  2,3-diethyl-pyrazine with a peak at a minimum level of 1000,
  2,5-diethyl-pyrazine with a peak at a minimum level of 900,
  2,6-diethyl-pyrazine with a peak at a minimum level of 4400,
  5-ethyl-2,3-dimethylpyrazine with a peak at a minimum level of 21000, and
  2-methyl-3,5-diethyl pyrazine with a peak at a minimum level of 4000.

8. A baked foodstuff with an improved flavor comprising flavor active molecules in the baked foodstuff comprising:
  2,5-di-methyl-4-hydroxy-3[2H]-furanone, 5-methylfurfural, diacetyl, and 2-acetyl-1-pyrroline wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 55000 for the peak corresponding to diacetyl, and 1000 for the peak corresponding to 2-acetyl-1-pyrroline;
  and at least one of the following flavors having a peak areas by GC-MS of:
  1,2 Diacetylethylene, with a peak at a minimum level of 8000,
  Ethylpyrazine, with a peak at a minimum level of 80000,
  2-ethyl-6-methylpyrazine with a peak at a minimum level of 117000,
  2-ethyl-5-methylpyrazine with a peak at a minimum level of 50000,
  2,3-diethyl-pyrazine with a peak at a minimum level of 1000,
  2,5-diethyl-pyrazine with a peak at a minimum level of 1000,
  2,6-diethyl-pyrazine with a peak at a minimum level of 10000,
  5-ethyl-2,3-dimethylpyrazine with a peak at a minimum level of 12000, and
  2-methyl-3,5-diethyl pyrazine with a peak at a minimum level of 4000.

9. A baked foodstuff with an improved flavor comprising flavor active molecules in the baked foodstuff comprising:
  2,5-di-methyl-4-hydroxy-3[2H]-furanone, 5-methylfurfural, diacetyl, and 2-acetyl-1-pyrroline wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 55000 for the peak corresponding to diacetyl, and 1000 for the peak corresponding to 2-acetyl-1-pyrroline;
  and at least one of the following flavors having a peak areas by GC-MS of:
  1,2 Diacetylethylene, with a peak at a minimum level of 275000, Ethylpyrazine, with a peak at a minimum level of 1428000,
2-ethyl-6-methylpyrazine with a peak at a minimum level of 1818000,
2-ethyl-5-methylpyrazine with a peak at a minimum level of 845000,
2,3-diethyl-pyrazine with a peak at a minimum level of 144000,
2,5-diethyl-pyrazine with a peak at a minimum level of 159000,
2,6-diethyl-pyrazine with a peak at a minimum level of 1084647,
5-ethyl-2,3-dimethylpyrazine with a peak at a minimum level of 359000, and
2-methyl-3,5-diethyl pyrazine with a peak at a minimum level of 212000.

10. A baked foodstuff with an improved flavor according to claim 1 wherein the flavor active molecules in the baked foodstuff comprise 2,5-di-methyl-4-hydroxy-3[2H]-furanone, 5-methylfurfural, 1,2-diacetyl-ethylene, ethyl-pyrazine, 2-ethyl-6-methylpyrazine, 2-ethyl-5-methylpyrazine, 2,3-diethyl-pyrazine, 2,5-diethyl-pyrazine, 2,6-diethyl-pyrazine, 5-ethyl-2,3-dimethylpyrazine, 2-methyl-3,5-diethyl pyrazine, diacetyl, and 2-acetyl-1-pyroline.

11. The baked foodstuff according to claim 10 wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 1000 for the peak corresponding to 1,2-diacetyl-ethylene, 90000 for the peak corresponding to ethyl-pyrazine, 50000 for the peak corresponding to 2-ethyl-6-methylpyrazine, 35000 for the peak corresponding to 2-ethyl-5-methylpyrazine, 5000 for the peak corresponding to 2,3-diethyl-pyrazine, 3000 for the peak corresponding to 2,5-diethyl-pyrazine, 11000 for the peak corresponding to 2,6-diethyl-pyrazine, 12000 for the peak corresponding to 5-ethyl-2,3-dimethylpyrazine, 4000 for the peak corresponding to 2-methyl-3,5-diethyl pyrazine, 55000 for the peak corresponding to diacetyl, 1000 for the peak corresponding to 2-acetyl-1-pyrroline.

12. The baked foodstuff according to claim 10 wherein the measurement of peak areas by GC-MS gives a minimum level of 50000 for the peak corresponding to 2,5-di-methyl-4-hydroxy-3[2H]-furanone a minimum level of 10000 for the peak corresponding to 5-methylfurfural a minimum level of 1000 for the peak corresponding to 1,2-diacetyl-ethylene a minimum level of 90000 for the peak corresponding to ethyl-pyrazine a minimum level of 50000 for the peak corresponding to 2-ethyl-6-methylpyrazine a minimum level of 35000 for the peak corresponding to 2-ethyl-5-methylpyrazine a minimum level of 5000 for the peak corresponding to 2,3-diethyl-pyrazine a minimum level of 3000 for the peak corresponding to 2,5-diethyl-pyrazine a minimum level of 11000 for the peak corresponding to 2,6-diethylpyrazine a minimum level of 12000 for the peak corresponding to 5-ethyl-2,3-dimethylpyrazine a minimum level of 4000 for the peak corresponding to 2-methyl-3,5-diethyl pyrazine a minimum level of 55000 for the peak corresponding to diacetyl and a minimum level of 1000 for the peak corresponding to 2-acetyl-1-pyrroline.

13. The baked foodstuff according to claim 1 wherein the improved flavor comprises at least one of the of the flavor characteristics selected from the group consisting of: biscuit, buttery, fruity, nutty, caramel, golden syrup, honey, toasted, roasted bread-like and baked.

14. The baked foodstuff according to claim 1 wherein the baked foodstuff exhibits improved texture.

15. The baked foodstuff according to claim 1 wherein the baked foodstuff comprises cereal flour.

16. The baked foodstuff according to claim 15 wherein the cereal flour is wheat flour.

17. The baked foodstuff according to claim 1 wherein the baked foodstuff is selected from the group consisting of wafer, extruded cereal and biscuit.

18. The baked foodstuff according to claim 1 wherein the foodstuff has been baked for between 1 and 3 minutes between two metal plates heated to between 140 to 180° C.

19. The baked foodstuff according to claim 1, wherein the flavor is generated by heating using a system selected from the group consisting of an oven, wafer baking process, infra red heating system, steam heating system, extruder, microwave oven, radio frequency oven, retort, pasteurization system and combinations of same.

20. A confectionery product comprising the baked foodstuff according to claim 1.

21. The baked foodstuff according to claim 1 wherein the flavor active molecules in the baked foodstuff additionally comprise 1,2-diacetyl-ethylene, ethyl-pyrazine, 2-ethyl-6-methylpyrazine, 2-ethyl-5-methylpyrazine, 2,3-diethyl-pyrazine, 2,5-diethyl-pyrazine, 2,6-diethyl-pyrazine, 5-ethyl-2,3-dimethylpyrazine and 2-methyl-3,5-diethyl pyrazine, wherein the ratio of peak areas measured by GC-MS for the baked foodstuff to the peak areas of a wafer prepared from a batter having the following formulation:

| | |
|---|---|
| Flour | 100.0 parts |
| Water | 120 to 180 parts |
| Sucrose | 0 to 4.0 parts |
| Fat | 0.5 to 2.0 parts |
| Lecithin | 0.1 to 1 parts |
| Sodium bicarbonate | 0.1 to 0.5 parts |
| Salt | 0 to 0.6 parts | and baked for between 1 and 3 minutes, between two metal plates heated to between 140 to 180° C., gives a minimum ratio selected from the group consisting of 4 for the peak corresponding to 2,5-di-methyl-4-hydroxy-3[2H]-furanone, 7 for the peak corresponding to 5-methylfurfural, 1.5 for the peak corresponding to ethyl-pyrazine, 2 for the peak corresponding to 2-ethyl-6-methylpyrazine, 1.5 for the peak corresponding to 2-ethyl-5-methylpyrazine, 1.6 for the peak corresponding to 2,3-diethylpyrazine, 2 for the peak corresponding to 2,5-diethyl-pyrazine, 2.5 for the peak corresponding to 2,6-diethylpyrazine, 1.6 for the peak corresponding to 5-ethyl-2,3-dimethylpyrazine, 2 for the peak corresponding to 2-methyl-3,5-diethyl pyrazine, 1.5 for the peak corresponding to diacetyl.

22. The baked foodstuff of claim 1 wherein the concentration is selected from the group consisting of 5-methylfurfural is greater than or equal to 0.1 µg/g, ethyl-pyrazine is greater than or equal to 0.3 µg/g, 2,3-diethyl-pyrazine is greater than or equal to 4 µg/kg, diacetyl is greater than or equal to 2 µg/g.

23. The baked foodstuff of claim 1 wherein the concentration of 5-methylfurfural is greater than or equal to 0.1 µg/g, the concentration of ethyl-pyrazine is greater than or equal to 0.1 µg/g, the concentration of 2,3-diethyl-pyrazine is greater than or equal to 2 µg/kg and the concentration of diacetyl is greater than or equal to 1.8 µg/g.

24. The baked foodstuff of claim 1 wherein the concentration of 5-methylfurfural is greater than or equal to 0.1 µg/g, the concentration of ethyl-pyrazine is greater than or equal to 0.3 µg/g, the concentration of 2,3-diethyl-pyrazine is greater than or equal to 4 µg/kg and the concentration of diacetyl is greater than or equal to 2 µg/g.

25. A baked foodstuff with an improved flavor comprising flavor active molecules in the baked foodstuff that comprise 5-methylfurfural at a minimum level of 0.9 µg/g, ethyl-pyrazine at a minimum level of 0.4 µg/g, 2,3-diethyl-pyrazine at a minimum level of 11 µg/kg and diacetyl at a minimum level of 14 µg/g.

26. A baked foodstuff with an improved flavor comprising flavor active molecules in the baked foodstuff that comprise 5-methylfurfural at a minimum level of 2.7 µg/g, ethyl-pyrazine at a minimum level of 2.7 µg/g, 2,3-diethyl-pyrazine at a minimum level of 45 µg/kg and diacetyl at a minimum level of 10 µg/g.

27. A baked foodstuff with an improved flavor comprising flavor active molecules in the baked foodstuff that comprise 5-methylfurfural at a minimum level of 0.2 µg/g, ethyl-pyrazine at a minimum level of 0.2 µg/g, 2,3-diethyl-pyrazine at a minimum level of 4.5 µg/kg and diacetyl at a minimum level of 3.8 µg/g.

28. A baked foodstuff with an improved flavor comprising flavor active molecules in the baked foodstuff that comprise 5-methylfurfural at a minimum level of 0.1 µg/g, ethyl-pyrazine at a minimum level of 0.1 µg/g, 2,3-diethyl-pyrazine at a minimum level of 1 µg/kg and diacetyl at a minimum level of 2 µg/g.

29. A baked foodstuff with an improved flavor comprising flavor active molecules in the baked foodstuff that comprise 5-methylfurfural at a minimum level of 2.4 µg/g, ethyl-pyrazine at a minimum level of 1.1 µg/g, 2,3-diethyl-pyrazine at a minimum level of 80 µg/kg and diacetyl at a minimum level of 15 µg/g.

30. A baked foodstuff with an improved flavor comprising flavor active molecules in the baked foodstuff that comprise 5-methylfurfural at a minimum level of 0.1 µg/g, ethyl-pyrazine at a minimum level of 0.1 µg/g, 2,3-diethyl-pyrazine at a minimum level of 2 µg/kg and diacetyl at a minimum level of 1 µg/g.

31. A baked foodstuff with an improved flavor comprising flavor active molecules in the baked foodstuff that comprise 5-methylfurfural at a minimum level of 0.1 µg/g, ethyl-pyrazine at a minimum level of 0.1 µg/g, 2,3-diethyl-pyrazine at a minimum level of 2 µg/kg and diacetyl at a minimum level of 2.3 µg/g.

32. A baked foodstuff with an improved flavor comprising flavor active molecules in the baked foodstuff that comprise 5-methylfurfural at a minimum level of 2.5 µg/g, ethyl-pyrazine at a minimum level of 3.4 µg/g, 2,3-diethyl-pyrazine at a minimum level of 70 µg/kg and diacetyl at a minimum level of 9.3 µg/g.

33. A confectionery product comprising the baked foodstuff according to claim 21.

34. The baked foodstuff according to claim 4 wherein the flavor active molecules in the baked foodstuff comprise 2,5-di-methyl-4-hydroxy-3[2H]-furanone, 5-methylfurfural, 1,2-diacetyl-ethylene, ethyl-pyrazine, 2-ethyl-6-methylpyrazine, 2-ethyl-5-methylpyrazine, 2,3-diethyl-pyrazine, 2,5-diethyl-pyrazine, 2,6-diethyl-pyrazine, 5-ethyl-2,3-dimethylpyrazine, 2-methyl-3,5-diethyl pyrazine, diacetyl, and 2-acetyl-1-pyrroline.

35. The baked foodstuff according to claim 34 wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 1000 for the peak corresponding to 1,2-diacetyl-ethylene, 90000 for the peak corresponding to ethyl-pyrazine, 50000 for the peak corresponding to 2-ethyl-6-methylpyrazine, 35000 for the peak corresponding to 2-ethyl-5-methylpyrazine, 5000 for the peak corresponding to 2,3-diethyl-pyrazine, 3000 for the peak corresponding to 2,5-diethyl-pyrazine, 11000 for the peak corresponding to 2,6-diethyl-pyrazine, 12000 for the peak corresponding to 5-ethyl-2,3-dimethylpyrazine, 4000 for the peak corresponding to 2-methyl-3,5-diethyl pyrazine, 55000 for the peak corresponding to diacetyl, 1000 for the peak corresponding to 2-acetyl-1-pyrroline.

36. The baked foodstuff according to claim 34 wherein the measurement of peak areas by GC-MS gives a minimum level of 50000 for the peak corresponding to 2,5-di-methyl-4-hydroxy-3[2H]-furanone a minimum level of 10000 for the peak corresponding to 5-methylfurfural a minimum level of 1000 for the peak corresponding to 1,2-diacetyl-ethylene a minimum level of 90000 for the peak corresponding to ethyl-pyrazine a minimum level of 50000 for the peak corresponding to 2-ethyl-6-methylpyrazine a minimum level of 35000 for the peak corresponding to 2-ethyl-5-methylpyrazine a minimum level of 5000 for the peak corresponding to 2,3-diethyl-pyrazine a minimum level of 3000 for the peak corresponding to 2,5-diethyl-pyrazine a minimum level of 11000 for the peak corresponding to 2,6-diethylpyrazine a minimum level of 12000 for the peak corresponding to 5-ethyl-2,3-dimethylpyrazine a minimum level of 4000 for the peak corresponding to 2-methyl-3,5-diethyl pyrazine a minimum level of 55000 for the peak corresponding to diacetyl and a minimum level of 1000 for the peak corresponding to 2-acetyl-1-pyrroline.

37. The baked foodstuff according to claim 2 wherein the improved flavor comprises at least one of the of the flavor characteristics selected from the group consisting of: biscuit, buttery, fruity, nutty, caramel, golden syrup, honey, toasted, roasted bread-like and baked.

38. The baked foodstuff according to claim 2 wherein the baked foodstuff exhibits improved texture.

39. The baked foodstuff according to claim 2 wherein the baked foodstuff comprises cereal flour.

40. The baked foodstuff according to claim 39 wherein the cereal flour is wheat flour.

41. The baked foodstuff according to claim 2 wherein the baked foodstuff is selected from the group consisting of wafer, extruded cereal and biscuit.

42. The baked foodstuff according to claim 2 wherein the foodstuff has been baked for between 1 and 3 minutes between two metal plates heated to between 140 to 180° C.

43. The backed foodstuff according to claim 2, wherein the flavor is generated by heating using a system selected from the group consisting of an oven, wafer baking process, infra red heating system, steam heating system, extruder, microwave oven, radio frequency oven, retort, pasteurization system and combinations of same.

44. A confectionery product comprising the baked foodstuff according to claim 2.

45. The baked foodstuff according to claim 3 wherein the flavor active molecules in the baked foodstuff comprise 2,5-di-methyl-4-hydroxy-3[2H]-furanone, 5-methylfurfural, 1,2-diacetyl-ethylene, ethyl-pyrazine, 2-ethyl-6-methylpyrazine, 2-ethyl-5-methylpyrazine, 2,3-diethyl-pyrazine, 2,5-diethyl-pyrazine, 2,6-diethyl-pyrazine, 5-ethyl-2,3-dimethylpyrazine, 2-methyl-3,5-diethyl pyrazine, diacetyl, and 2-acetyl-1-pyrroline.

46. The baked foodstuff according to claim 45 wherein the measurement of peak areas by GC-MS gives a minimum level selected from the group consisting of 50000 for the peak corresponding to 2,5-di-methyl-4-hydroxy-3[2H]-furanone, 10000 for the peak corresponding to 5-methylfurfural, 1000 for the peak corresponding to 1,2-diacetyl-ethylene, 90000 for the peak corresponding to ethyl-pyrazine, 50000 for the peak corresponding to 2-ethyl-6-methylpyrazine, 35000 for the peak corresponding to 2-ethyl-5-methylpyrazine, 5000 for the peak corresponding to 2,3-diethyl-pyrazine, 3000 for the peak corresponding to 2,5-diethyl-pyrazine, 11000 for the peak corresponding to 2,6-diethyl-pyrazine, 12000 for the peak corresponding to 5-ethyl-2,3-dimethylpyrazine, 4000 for the peak corresponding to 2-methyl-3,5-diethyl pyrazine, 55000 for the peak corresponding to diacetyl, 1000 for the peak corresponding to 2-acetyl-1-pyrroline.

47. The baked foodstuff according to claim 45 wherein the measurement of peak areas by GC-MS gives a minimum level of 50000 for the peak corresponding to 2,5-di-methyl-4-hydroxy-3[2H]-furanone a minimum level of 10000 for the peak corresponding to 5-methylfurfural a minimum level of 1000 for the peak corresponding to 1,2-diacetyl-ethylene a minimum level of 90000 for the peak corresponding to ethyl-pyrazine a minimum level of 50000 for the peak corresponding to 2-ethyl-6-methylpyrazine a minimum level of 35000 for the peak corresponding to 2-ethyl-5-methylpyrazine a minimum level of 5000 for the peak corresponding to 2,3-diethyl-pyrazine a minimum level of 3000 for the peak corresponding to 2,5-diethyl-pyrazine a minimum level of 11000 for the peak corresponding to 2,6-diethylpyrazine a minimum level of 12000 for the peak corresponding to 5-ethyl-2,3-dimethylpyrazine a minimum level of 4000 for the peak corresponding to 2-methyl-3,5-diethyl pyrazine a minimum level of 55000 for the peak corresponding to diacetyl and a minimum level of 1000 for the peak corresponding to 2-acetyl-1-pyrroline.

48. The baked foodstuff according to claim 3 wherein the improved flavor comprises at least one of the of the flavor characteristics selected from the group consisting of: biscuit, buttery, fruity, nutty, caramel, golden syrup, honey, toasted, roasted bread-like and baked.

49. The baked foodstuff according to claim 3 wherein the baked foodstuff exhibits improved texture.

50. The baked foodstuff according to claim 3 wherein the baked foodstuff comprises cereal flour.

51. The baked foodstuff according to claim 50 wherein the cereal flour is wheat flour.

52. The baked foodstuff according to claim 3 wherein the baked foodstuff is selected from the group consisting of wafer, extruded cereal and biscuit.

53. The baked foodstuff according to claim 3 wherein the foodstuff has been baked for between 1 and 3 minutes between two metal plates heated to between 140 to 180° C.

54. The baked foodstuff according to claim 3, wherein the flavor is generated by heating using a system selected from the group consisting of an oven, wafer baking process, infra red heating system, steam heating system, extruder, microwave oven, radio frequency oven, retort, pasteurization system and combinations of same.

55. A confectionery product comprising the baked foodstuff according to claim 3.

* * * * *